June 1, 1965 O. B. DENNY 3,186,585
COLLAPSIBLE BREAD CRATE
Filed Oct. 22, 1962 2 Sheets-Sheet 1
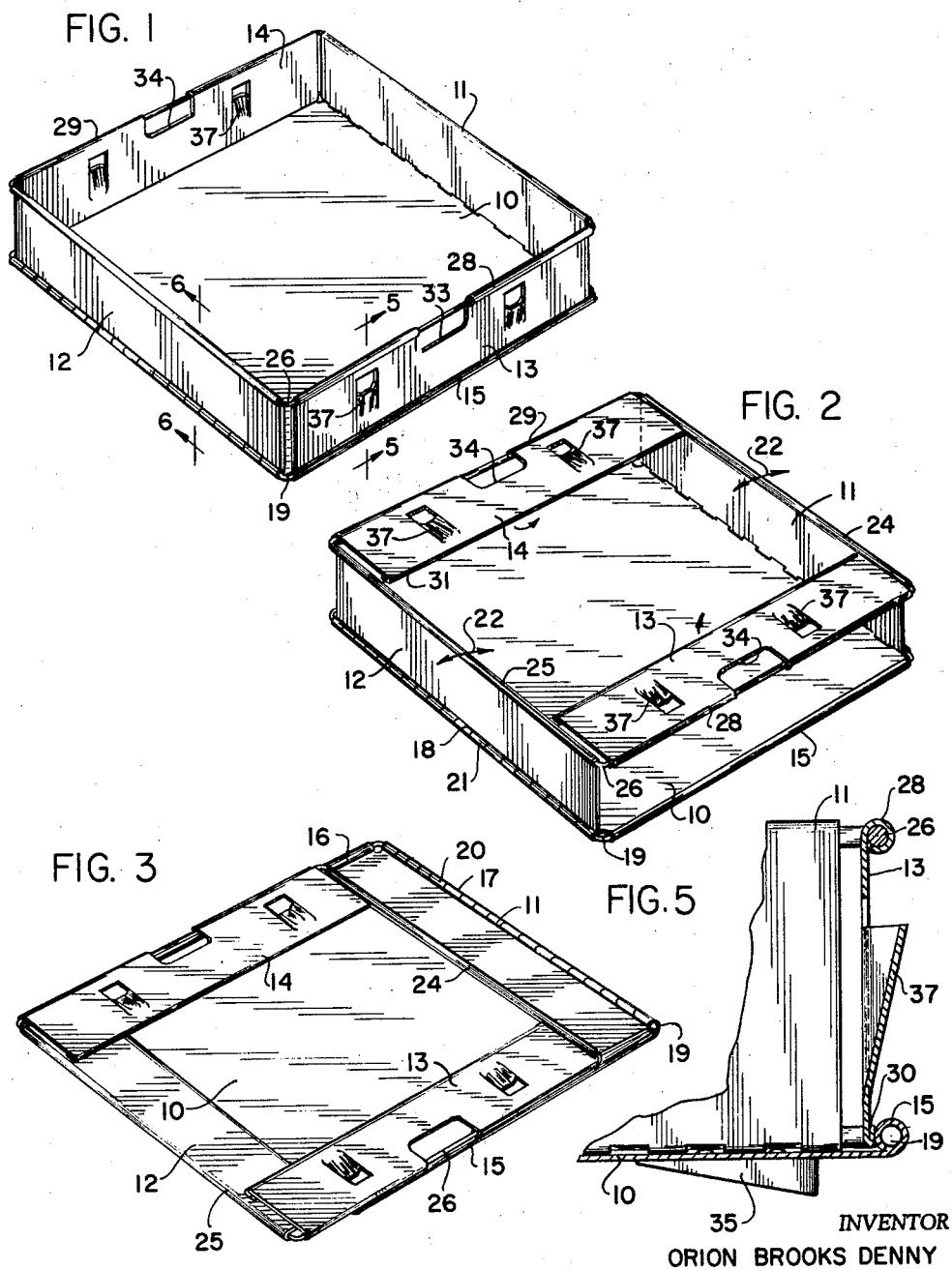
INVENTOR
ORION BROOKS DENNY
BY
ATTORNEY June 1, 1965   O. B. DENNY   3,186,585
COLLAPSIBLE BREAD CRATE
Filed Oct. 22, 1962   2 Sheets-Sheet 2

INVENTOR
ORION BROOKS DENNY
BY
ATTORNEY

United States Patent Office 3,186,585
Patented June 1, 1965

3,186,585
COLLAPSIBLE BREAD CRATE
Orion B. Denny, Gastonia, N.C., assignor to
S. W. Smith, Jr., Charlotte, N.C.
Filed Oct. 22, 1962, Ser. No. 232,153
1 Claim. (Cl. 220—97)

This invention relates to the handling and transportation of commodities and to equipment including collapsible containers by which commodities such as bread or the like can be delivered and due to the collapsibility of the containers they can be stored more compactly and in a much smaller space making it possible to carry a load on a return trip.

The invention relates particularly to a folding bread crate which can be used with other stacked trays in the delivery of bread and which trays can be collapsed to make room for a return load of substance other than bread and is an improvement over Patent 2,512,522, issued June 20, 1950.

The bread crates of my above identified patent each contained four rectangular projections which maintained the filled crates in stacked relation but interfered with the lateral or horizontal removal of a filled crate from a stack since the end of the projection would hang unless lifted vertically and they did not have means for maintaining a series of collapsed crates in stacked relation.

It is an object of the invention to provide a collapsible stackable article container which can be used for holding bread or other articles in readily stacked relation and retained in such stacked relation with other containers of similar character but readily disengageable from other containers including the one upon which it is supported by a lateral or substantially horizontal application of force without having to support the entire weight of the end of tray with its contents.

Another object of the invention is to provide a collapsible stackable container which can be used for bread and other objects and which is of simple construction, can be readily produced and which can be quickly disposed and maintained in stacked or unstacked relation whether in extended or collapsed condition and when collapsed can be placed with other collapsed containers in an area in which they occupy only a fraction of that of the extended containers.

Figure 4:
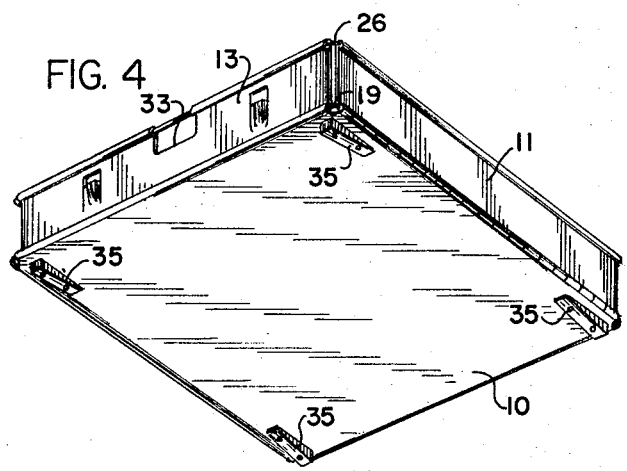
Figure 6:
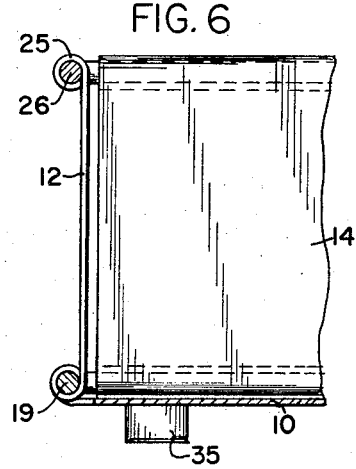
Figure 7:
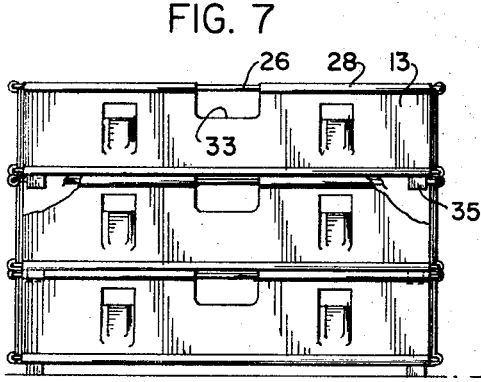
Figure 8:
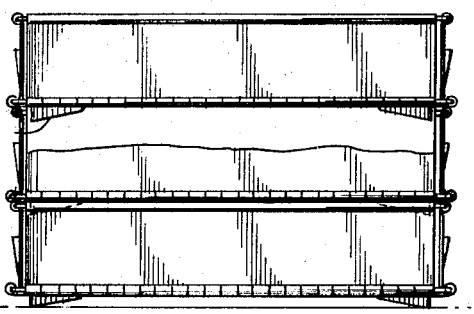
Figure 9:
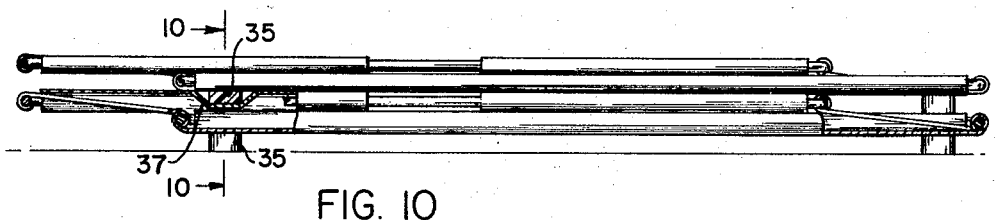
Figure 10:
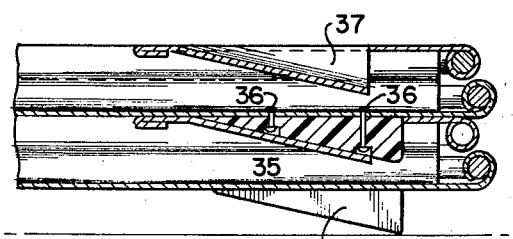

Other objects and advantages of the invention will be apparent from the following description taken in conjunction with the accompanying drawings wherein:

FIG. 1 is a perspective of the article container in raised position;

FIG. 2, a perspective similar to FIG. 1, illustrating the first step in the collapsing of the container;

FIG. 3, a perspective illustrating the container fully collapsed;

FIG. 4, a perspective of the bottom of the container;

FIG. 5, an enlarged fragmentary detail section on the line 5—5 of FIG. 1;

FIG. 6, an enlarged fragmentary detail section on the line 6—6 of FIG. 1;

FIG. 7, a side elevation of a group of stacked containers;

FIG. 8, an end elevation of the stack of containers of FIG. 7;

FIG. 9, an enlarged side elevation of a stack of containers in collapsed condition; and FIG. 10, an enlarged detail section on the line 10—10 of FIG. 9.

Briefly stated, the device of the present invention comprises a collapsible, stackable container which may be filled with commodities such as loaves of bread and stacked one upon another with means provided for preventing the containers from becoming dislocated or sliding from the stack and when each container has been emptied two of the sides are adapted to be raised approximately 90° and the other two sides pivoted to collapse the container, means being provided for interengagement between collapsed containers to eliminate any sliding movement.

With continued reference to the drawings, the present invention includes a bottom 10, side walls 11 and 12, and end walls 13 and 14. The bottom 10 is provided with a hinge forming sleeve 15 along and slightly above one end portion, a similar sleeve at its opposite end and a plurality of spaced sleeves 17 and 18 spaced along and slightly above its side portions. The sleeves 15, 16, 17 and 18 receive a rod or pintle 19 of a configuration corresponding to the shape of the bottom 10.

The lower edges of the sides 11 and 12 are provided with spaced sleeves 20 and 21, respectively, which are disposed alternately with the sleeves 17 and 18 and receive the rods or pintle 19 to form pivotal connections between the sides and bottom and which permit such sides to be folded in either direction flat against the bottom as illustrated by the arrow 22 of FIG. 2.

The upper edges of the sides 11 and 12 are rolled outwardly to form sleeves 24 and 25, respectively, which pivotally receive a rod 26 of rectangular shape to conform to the configuration of the container. The upper edges of the end members 13 and 14 are formed into sleeves 28 and 29, respectively, which pivotally engage the rod 26, such rod forming a pintle or hinge.

The lower edges of the ends 13 and 14 are folded upon themselves to provide strengthening flanges 30 and 31 which bear against the sleeves 15 when the side walls of the container are in upright position. In order to facilitate lifting of the container the end walls 13 and 14 are provided with cutout portions 33 and 34 to accommodate the hands of an operator and permit the operator to grasp the rod 26 to lift the container.

The bottom 10 is provided with a tapered foot 35 at each of its corners with the tapered portions extending inwardly from square locating ends 13 and 14, the taper of the foot extending towards the center of the container. Each foot is attached to the bottom 10 by rivets 36 or other fastening means. When the containers are in upright position one container may be stacked on top of another and the four feet 35, one at each corner, are received within the lower container to prevent the upper container from sliding laterally or horizontally in any direction.

In order to stack the containers when such containers are collapsed, the end members 13 and 14 are each provided with a pair of tapered portions 37 struck from the end members and one of such pairs on each end will receive the feet 35 of the next uppermost container. It will be apparent from FIG. 9 that the upper rod 26 will be offset from the lower rod 19 when the containers are collapsed and since the containers can be collapsed to either side the feet 35 on the bottom 10 will be received within the struck portions 37 and the feet on the other side of the bottom will extend outwardly of the upper rod 26. In this manner the bottom 10 of the upper container rests upon the end sleeves 28 and 29 of the lower container and either the upper side sleeves 24 or 25, depending upon which direction the container is collapsed.

In the operation of the device a series of containers may be raised to upright position and filled with commodities of a height not exceeding the height of the container and thereafter one container may be stacked upon another with the feet 35 of the upper container received within the marginal limits of the lower container. When the commodities have been removed from the uppermost container the empty container may be removed to allow access to the commodities of the next container. When the empty container is removed it may be collapsed to reduce the amount of space it occupies and for this purpose the ends 13 and 14 are pivoted inwardly about the rod 26 and thereafter the side members 11 and 12 are pivoted about the rod 19 in a direction normal to the direction of movement of the ends 13 and 14. When the next container has been emptied it may be collapsed in a manner similar to that with respect to the first container and placed on top of such first container. Such container is prevented from slipping while in collapsed condition by mounting two of the feet 35 of the second container within the corresponding portions 37 of the first container to prevent slipping of the second container in any direction.

It will be obvious to those skilled in the art that various changes may be made in the invention without departing from the spirit and scope thereof and therefore the invention is not limited by that which is illustrated in the drawings and described in the specification, but only as indicated in the accompanying claim.

What is claimed is:

A collapsible bread crate of a character to be stacked upon itself both in extended and collapsed condition, said bread crate comprising a bottom and a first and a second pair of side members of sheet material, one pair of side members being pivoted at their lower edges to the bottom and the other pair of side members being pivoted at its upper edges between the upper edges of the first side members whereupon the first pair of side members pivoted to the bottom may be moved in either direction from an upright position to a generally horizontal position substantially in the plane of the bottom and said second side members may be pivotally moved toward each other to a collapsed position close to the plane of the bottom, said bottom having substantially correspondingly elongated tapered projections on its under surface, one adjacent each corner, said tapered projections being positioned at spaced aligned locations on said bottom inwardly of the edges thereof and extending longitudinally inwardly from adjacent edges of said other two opposed sides thereof with the thickness of the projection gradually reduced from said adjacent edge toward the edge opposite thereto, and said two other side members having struck-out portions corresponding in taper to said projections and so located that when collapsed crates are in stacked relation the struck-out portions on one of said other walls will have cooperative interlocking engagement with the projections adjacent the corresponding side of an adjacent crate, the interlocking engagement of said struck-out portions and the projections of a superimposed collapsed crate limiting relative lateral movement of stacked collapsed crates but by slight lifting of a crate at one side permitting such side to be withdrawn from engagement with an underlying crate and enabling the oppositely inclined opposite projections to ride over the near edge of the underlying crate.

References Cited by the Examiner

UNITED STATES PATENTS

| | | | |
|---|---|---|---|
| 2,512,522 | 6/50 | Denny | 220—97 |
| 2,553,607 | 5/51 | Rosenberg | 220—97 |
| 2,782,950 | 2/57 | Corr | 220—97 |
| 2,850,204 | 9/58 | Rehrig | 220—97 |

FOREIGN PATENTS 1,040,163  10/53  France.

THERON E. CONDON, *Primary Examiner.*

EARLE J. DRUMMOND, *Examiner.*